Nov. 18, 1947.  O. GERBES  2,430,979
CATALYTIC ISOMERIZATION OF PARAFFINIC HYDROCARBONS
Filed Dec. 29, 1944

INVENTOR.
Otto Gerbes
BY
J D McKean
ATTORNEY.

Patented Nov. 18, 1947

2,430,979

UNITED STATES PATENT OFFICE 2,430,979

CATALYTIC ISOMERIZATION OF PARAFFINIC HYDROCARBONS

Otto Gerbes, Goose Creek, Tex., assignor to Standard Oil Development Company, a corporation of Delaware Application December 29, 1944, Serial No. 570,447

4 Claims. (Cl. 260—683.5)

The present invention is directed to a continuous process including the use of a metal halide catalyst for reacting hydrocarbons.

More particularly, the present invention is directed to a continuous process wherein a hydrocarbon feed stock is reacted with a metal halide catalyst in the presence of a promoter and product from the reaction is separated by distillation into promoter, unreacted feed stock contaminated by metallic halide catalyst and desired product with a minimum amount of fouling of the distillation equipment.

The present invention may be briefly described as involving a process wherein a paraffinic feed stock is heated and the heated feed stock divided into two portions with one portion subjected to a reaction involving contact with a metal halide catalyst and a hydrogen halide promoter and the product of the reaction sent to a distillation step, the other heated portion sent direct to the distillation step to furnish heat for conducting the distillation and for stripping hydrogen halide promoter from the product. As additional steps, the hydrogen halide promoter may be returned to the reaction zone, and the unconverted feed stock separated from converted feed stock and at least a portion thereof sent to the reaction zone. A specific application of the present invention is a process wherein a normal paraffinic feed stock is reacted in the presence of a volatile catalyst of the character of aluminum chloride and a promoter of the character of hydrogen chloride and the mixture from the isomerization reaction distilled to separate hydrogen chloride and isomerized product from unreacted normal paraffinic feed stock and wherein heated paraffinic feed stock is employed to furnish heat for the distillation step.

Figure 1:
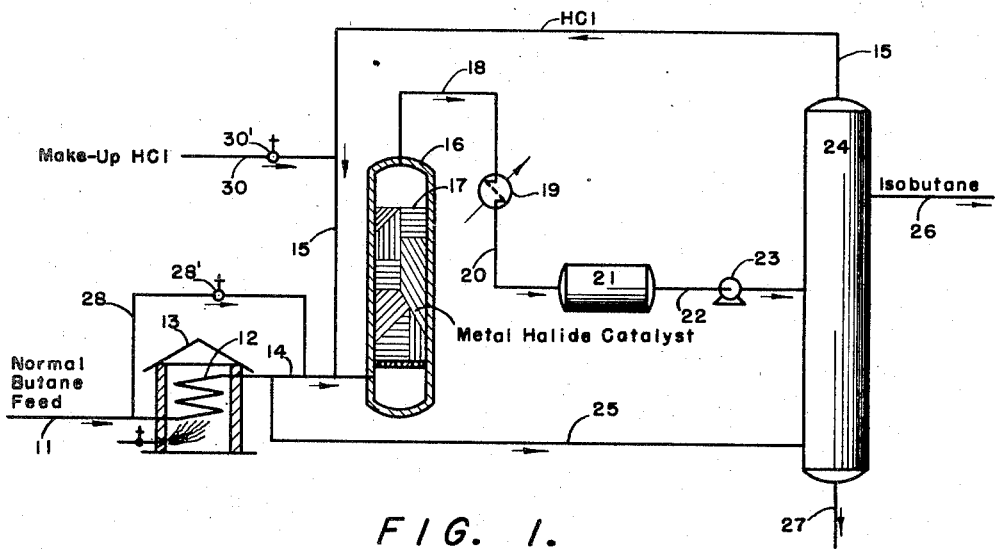
Figure 2:
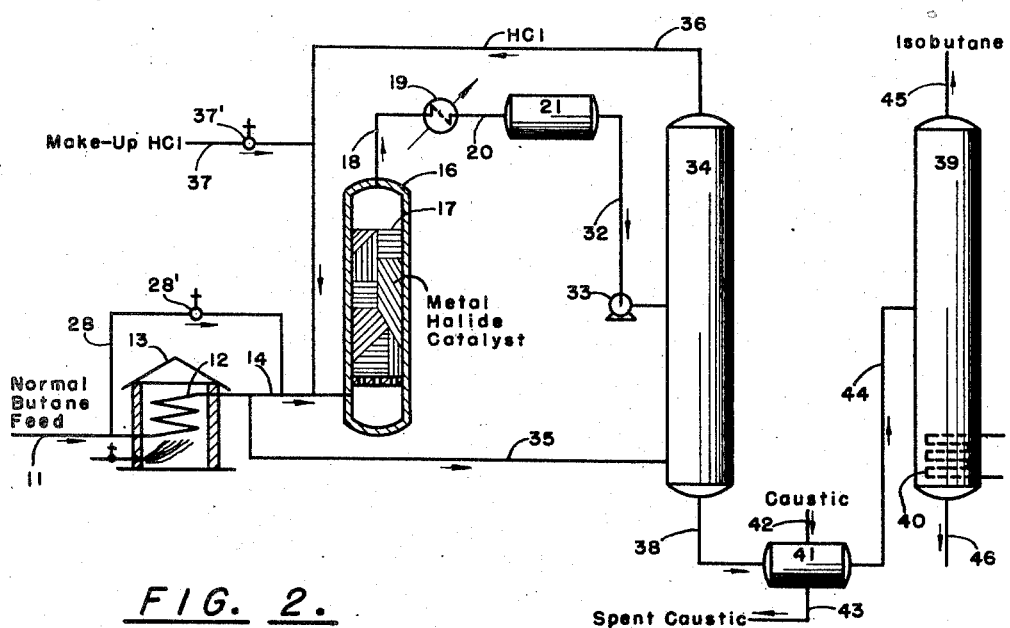

A preferred mode for practicing the present invention will now be described in detail in conjunction with the drawing in which Fig. 1 is in the form of a diagrammatic flow sheet illustrating one method for practicing the invention; and Fig. 2 is in the form of a diagrammatic flow sheet illustrating another modification of the present invention.

Turning now specifically to the drawing, and first to Fig. 1, a normal paraffinic feed stock enters the system through inlet line 11 and is heated by passing through coil 12 arranged in furnace 13. The heated feed stock passes from coil 12 through line 14 and has admixed therewith hydrogen chloride from line 15 and the mixture passes into reaction chamber 16. Reaction chamber 16 may be of the type conventionally used for conducting isomerization reactions and may be provided with a porous carrier on which is deposited a metal halide catalyst such as aluminum chloride; the catalytic bed is indicated in the drawing by cross-hatching and is designated by numeral 17.

The isomerization of a normal paraffinic feed stock in the presence of a promoter of the character of hydrogen chloride and a catalyst bed having a metal halide catalyst deposited thereon is well-known to the art and, accordingly, this operation will not be described in detail. It may be stated that it is usually desirable to maintain the reaction mixture within chamber 16 at a temperature within the range of 200° and 250° F. with the pressure adjusted to avoid condensation of the hydrocarbons therein. A pressure of the order of about 250 lbs./sq. in. is usually desirable in carrying out the isomerization of butane without causing condensation of hydrocarbons within the reaction chamber.

The product is removed from reaction chamber 16 through outlet line 18 and includes isomerized hydrocarbon, unreacted normal hydrocarbon, hydrogen chloride promoter and metal halide catalyst which is carried out of the reaction chamber 16 and may be present in the product as such or in the form of a hydrocarbon complex. The product passes from line 18 through a condenser 19 where it is cooled by a heat exchange with a suitable liquid, such as water at atmospheric temperature, and then passes through line 20 to accumulator 21. From accumulator 21 product is withdrawn through line 22 containing pump 23 and forced into fractionating tower 24.

In the fractionating tower 24 the product from the reaction chamber 16 is separated into a hydrogen chloride fraction, an isomerized fraction which may be withdrawn as desired product, and a normal paraffinic fraction contaminated with metal chloride catalyst. It will be understood that in order to operate the catalytic process efficiently, it is necessary to recover the hydrogen chloride promoter and recycle it to the reaction zone. In the stripping of the hydrogen chloride vapors from the mixture withdrawn from the catalytic reaction zone, it is desirable to eliminate contact of the mixture with hot metal surfaces. Contact of the mixture withdrawn from the catalytic chamber 16 with hot metal surfaces in stripping column 24 is avoided by utilizing hot normal paraffinic feed stock as a heating medium. Normal paraffinic feed stock which has been heated in furnace 13 is withdrawn from line 14 through branch line 25 and discharged into a lower portion of stripping column 24.

The hydrogen chloride vapors stripped in column 24 are withdrawn as overhead through line 15 and recycled via line 14 to the hydrocarbon feed stock being passed to the reaction zone. Make-up hydrogen chloride may be added to recycle line 15 by inlet 30 controlled by valve 30'. The isomerized hydrocarbon is withdrawn from column 24 as a side stream through line 26. The higher boiling component in column 24 includes normal paraffinic feed stock which has been passed through reaction chamber 16 without being isomerized, the normal paraffinic feed stock which was diverted through line 25 to furnish heat to the stripping column as well as the contaminants including iron, aluminum halide and volatile matter which would deposit on the heated surfaces of heat exchanger means, if such means were employed therein. The higher boiling fraction is withdrawn from the bottom of column 24 through outlet 27. And in the interest of efficiency, it is usually desirable that the hot paraffinic hydrocarbon discharged into distillation tower 24 be at a substantially higher temperature than the feed discharged into reaction vessel 16. In order to maintain a difference in temperature between the feed discharged into reaction zone 16 and the hot paraffinic hydrocarbon discharged into distillation zone 24, it is desirable to provide a by-pass line 28 controlled by valve 28' which allows the normal paraffinic feed stock from inlet line 11 to be split with a portion passed into furnace 13 and the remainder by-passing the furnace through line 28. By the use of this arrangement the hot normal paraffinic fraction passed through line 25 to tower 24 may be at a substantially higher temperature than the feed discharged into reaction vessel 16.

Another modification of the present invention is shown in Fig. 2. In this modification, the step of heating the normal paraffinic feed and reacting it in the reaction chamber in the presence of a metal halide catalyst deposited on a carrier is exactly the same as in the preceding figure. Accordingly, the furnace and the reaction chamber with the connecting flow lines are designated by numerals corresponding to those used in Fig. 1. The mixture is withdrawn from reaction chamber 16 through line 18 and passes through cooler 19 and line 20 to accumulator 21. The product is then separated into component parts by fractional distillation. Product is withdrawn from accumulator 21 through line 32 containing pump 33 and discharged into a distillation column 34. Heat for conducting the distillation operation in column 34 is provided by heated normal paraffinic feed stock which is withdrawn from line 14 through branch line 35. It is desirable that the temperature of the stream discharged through line 35 into distillation zone 34 be at a substantially greater temperature than the stream of feed stock discharged into reaction zone 16. Accordingly, in this embodiment, as in that of Fig. 1, a by-pass line 28 controlled by valve 28' is provided so that a feed stream passed into the system through inlet 11 may be split with a portion passing through furnace 13 and the remainder by-passing through line 28. By this arrangement the temperature of the feed stream passed into the reaction zone may be controlled by mixing unheated feed stock with heated feed stock while a fraction of substantially higher temperature than the mixture passed into reaction zone 16 may be passed through line 35 and used to provide heat in distillation zone 34.

In column 34, hydrogen chloride is stripped from the remainder of the product withdrawn from reaction zone 16 and is discharged into recycle line 36. Make-up hydrogen chloride may be added to line 36 by inlet 37 controlled by valve 37'. From the bottom of column 34 a bottoms fraction including a mixture of normal and isoparaffins and contaminants including iron, aluminum, aluminum halide and high molecular weight hydrocarbons is withdrawn through line 38. The isoparaffin product is separated from the unconverted normal paraffin by distillation in column 39 provided with a conventional means for supplying heat thereto such as a heat exchanger or reboiler 40. It is desirable to remove at least a major portion of the contaminants from the hydrocarbon stream withdrawn as bottoms from column 34 before subjecting it to distillation in column 39 and this may be done by washing the stream with caustic. The caustic washing step may be conducted in conventional equipment and is indicated in the drawing as conducted in vessel 41 with caustic supplied through inlet line 42 and spent caustic withdrawn through outlet line 43. The caustic washed bottoms fraction, freed from at least a major portion of the contaminants is passed from vessel 41 via line 44 into distillation column 39. Column 39 is provided with a means for supplying heat thereto such as a conventional heat exchanger or reboiler which is shown in the drawing as a coil designated by numeral 40.

In column 39, the mixture is separated into a low boiling isobutane fraction and a higher boiling fraction including normal paraffinic feed stock which has passed through reaction chamber 16 without being converted and paraffinic feed stock which was diverted through branch line 35 to serve as the heating medium in column 34 and contaminants. The low boiling isobutane fraction is withdrawn as overhead through line 45 while the higher boiling normal butane fraction is withdrawn from column 39 through line 46.

In both embodiments shown in the drawing, the quantity of stock withdrawn through branch lines 25 and 35 and employed for stripping the product will obviously vary with the temperature of the vapors leaving furnace 13, the amount of product withdrawn from reaction chamber 16 and the percentage of hydrogen chloride in the product. In the embodiment of Fig. 2, the heated normal paraffin employed as a stripping medium will usually be from 10 to 40% of the feed stock discharged into the reactor. As an example, 3,000 gals./hr. of feed butane at 340° F. will strip the hydrogen chloride from 7,000 gals./hr. of reactor product containing 6 weight per cent of HCl, with the stripped mixture being withdrawn from the bottom of the tower at the temperature of 220° F. In the embodiment of Fig. 1 wherein the heated normal paraffinic feed stock both for stripping hydrogen chloride and for separating as a condensate fraction the isomerized product, it will usually be desirable to use substantially more of the heated normal paraffin as a heating medium and in this embodiment from 20 to 80% of the amount of normal butane passed to reactor 16 may be diverted through line 25 and employed as the heating medium in column 24. While 80% is a convenient upper limit on the amount of hydrocarbon diverted, the amount will actually be dictated by the amount of heat which can be supplied economically by the furnace 13. Ordinarily, the amount of hydrocarbon diverted will be the amount required to supply the heat necessary to strip hydrogen chloride from the reactor effluent.

Having fully described and illustrated the practice of the present invention, what I desire to claim is:

1. A process for isomerizing paraffinic hydrocarbons including the steps of forming a stream of normal paraffinic feed stock, dividing the stream into first and second portions, passing the first portion as a stream through a heating zone to form a heated stream, dividing a third portion from the heated stream, mixing the remainder of the heated stream with the second portion to form a mixture which is cooler than said third portion, passing the mixture into a reaction zone and reacting it therein in the presence of a metallic halide catalyst and a hydrogen halide promoter to produce isomerized paraffins, removing as product from the reaction zone an isomerized mixture including normal paraffins, isomerized paraffins, hydrogen halide and contaminants boiling substantially above the hydrocarbons present in said mixture, said contaminants being capable of fouling heating surfaces in subsequent distillation equipment, charging said product into a distillation zone, charging the third portion into the distillation zone to provide heat for stripping the hydrogen halide from the mixture, removing the hydrogen halide as overhead from the distillation zone and returning it to the reaction zone, and removing from the distillation zone a residual liquid fraction containing at least the major portion of the contaminants charged into said zone.

2. A method in accordance with claim 1 in which the third portion is from 20 to 80 percent as great as the first and second portion.

3. A method in accordance with claim 1 in which an isomerized paraffinic fraction is separated as a distillate fraction in the distillation zone and is withdrawn as product.

4. A method in accordance with claim 1 in which the residual liquid fraction withdrawn from the distillation zone includes isomerized paraffins and normal paraffins and is subjected first to caustic alkali washing treatment to remove contaminants and then to a fractional distillation step in a second distillation zone to separate isomerized hydrocarbons as a distillate fraction and normal paraffinic hydrocarbons as a residual fraction.

OTTO GERBES.

REFERENCES CITED

The following references are of record in the file of this patent:

UNITED STATES PATENTS

| Number | Name | Date |
|---|---|---|
| 2,001,150 | Nelson | May 14, 1935 |
| 2,337,419 | Sensel | Dec. 21, 1943 |
| 2,361,368 | Evering et al. | Oct. 31, 1944 |
| 2,364,583 | de Simo et al. | Dec. 5, 1944 |
| 2,365,543 | Gerhold | Dec. 19, 1944 |
| 2,314,297 | Watson | Mar. 16, 1943 |